Oct. 9, 1962    R. E. DUMAS    3,057,202
FORCE MEASURING INSTRUMENT
Filed Feb. 18, 1957    2 Sheets-Sheet 2
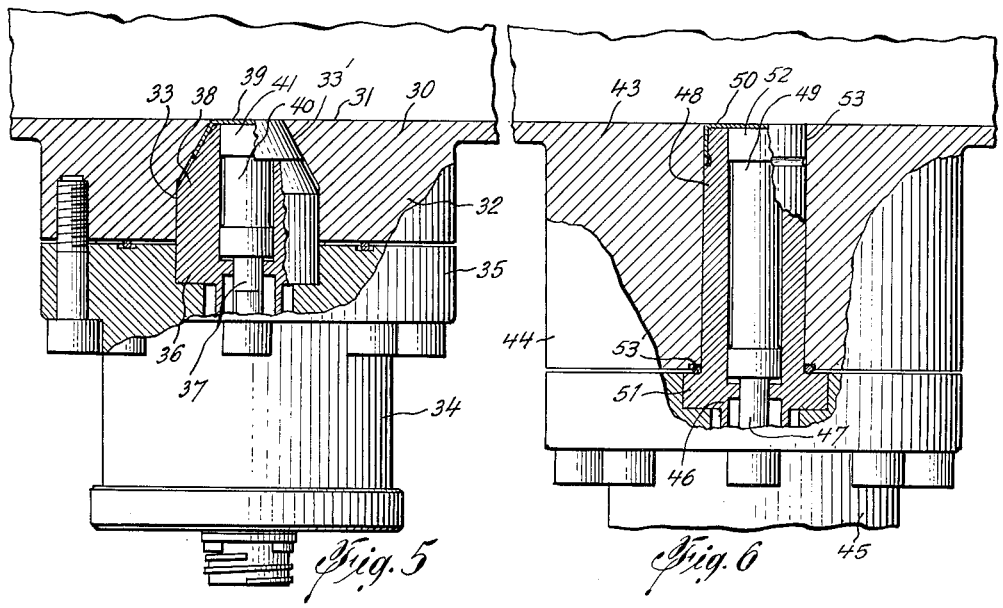
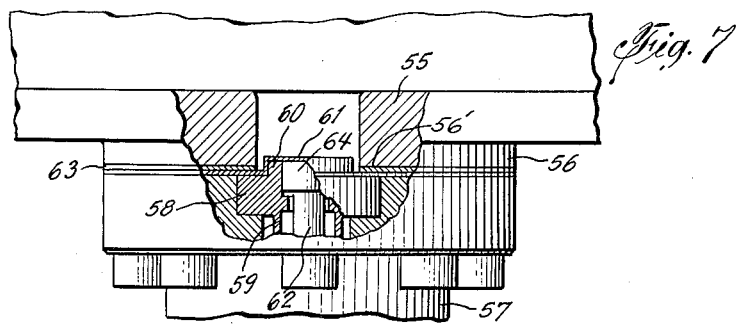
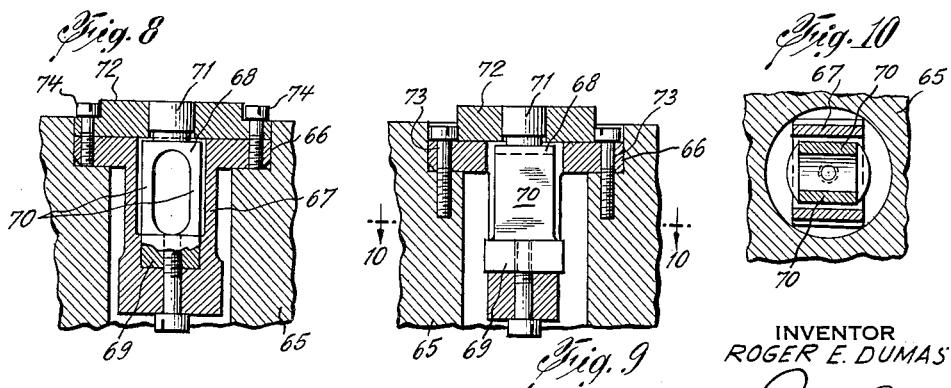
INVENTOR
ROGER E. DUMAS
BY
ATTORNEY

# United States Patent Office 3,057,202
Patented Oct. 9, 1962

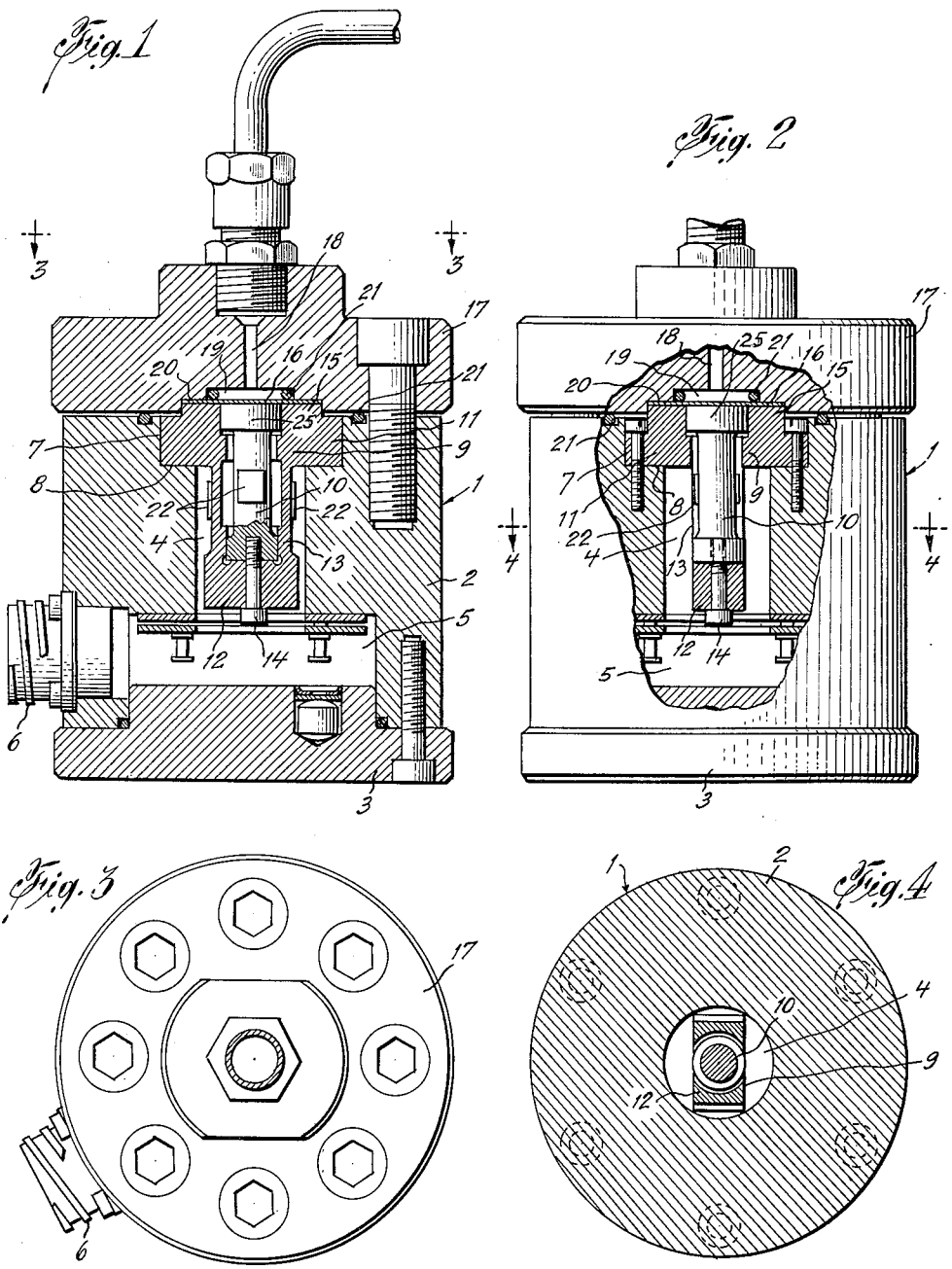

3,057,202
FORCE MEASURING INSTRUMENT
Roger E. Dumas, Snyder, N.Y., assignor to Taber Instrument Corporation, North Tonawanda, N.Y., a corporation of New York
Filed Feb. 18, 1957, Ser. No. 640,664
7 Claims. (Cl. 73—398)

This invention relates to a force measuring instrument.

The invention provides a transducer and instrument for measuring forces of various types, particularly high pressures of the order of 30,000 pounds per square inch.

The instrument provided by the invention has a pair of force responsive members for receiving application of forces to be measured, in which the forces compress one of the members while simultaneously tensioning the other. Means are provided for measuring the variation in stress in each of the members in determining the force and variations thereof applied to said members.

The invention provides an instrument having a pair of force responsive members in which one member supports the other, with one of said members suitably supported so that applications of force applied to the other of said members will compress one of said members and tension the other of said members in such a way that means sensitive to variation in stress in said members will indicate the force and variations thereof applied to said members. Suitable means, such as strain gauges, or electromagnetic means, may be used for measuring stress variations in said members.

The invention provides a force measuring instrument in which a casing is formed with a compartment extending longitudinally from end to end thereof, opening into a recess at one end and a chamber in the other end. A pair of force responsive members are mounted in the compartment in said casing, with one member formed with a flange, supporting portion, or insert engaged in said recess and seated in one end of the casing for suspending the remaining portions of the members in the compartment. The member engaged with the casing has a projection on the outer end extending beyond the end of the casing. This projection is formed for inter-fitting engagement in an aperture in a wall or cap portion to which the casing is secured. The aperture in the wall or cap portion is aligned with the casing and the force responsive members.

The force responsive member supported by the casing carries the other member in substantially coaxial relation therein with one end secured to the first member and the opposite end terminating in substantially coplanar relation with the opposite end of the first member and directed toward the central portion of the aperture in the wall or cap portion. The projection is formed to support a flexible barrier engaged over the ends of the force responsive members, to provide a seal for efficiently isolating fluids from contacting these members in the operation of the instrument. The projection on the one force responsive member has a marginal portion sealing the marginal portion of the flexible barrier in the aperture in the wall portion.

The invention further provides a force measuring instrument having a casing containing means for measuring a force and variations thereof, with a projection extending from one end for engagement in an aperture in a wall portion so that the projection may have a length sufficient to extend through the aperture and terminate in substantially flush relation with the opposite face of the wall portion for supporting a flexible barrier in substantially coplanar relation with the opposite wall surface. The flexible barrier will be retained by the projection in the aperture to seal the aperture in the wall portion and also have the force responsive means engaging the barrier on one face for measuring pressure variations of fluids applied to the other face of the barrier. This provides an instrument in which the end of the projection and barrier are arranged to have the surface at the end of the instrument in substantially coplanar relation with the adjacent surface of the wall portion in order to eliminate turbulence in fluid flow along the wall portion. This wall portion may be part of a vessel, conduit, airplane wing surface, guided missile wall surface, or other surface where forces are to be measured.

The invention comprehends the provision of a force measuring instrument in which a projection engages in an aperture in a wall portion with one end substantially flush with the surface of the wall portion, opposite to that on which the instrument is mounted, where the projection is formed on one of a pair of force responsive members, while the other member has a force receiving end movably mounted in the projection and terminating in substantially coplanar relation with the end of the projection for receiving applications of force so that the members will be responsive to force applied to the end of the inner member for measuring the force and variations thereof by suitable means associated with said members.

The invention provides an instrument for measuring forces that are very high and where a pair of members are arranged with spaced parallel portions intermediate the ends having means sensitive to variations in stress associated with these portions for measuring the force applied thereto and variations thereof.

The instrument provides a pair of force measuring members having one member formed with a flange structure for suspending both of said members in a casing, with spaced parallel portions of each member extending between opposite ends of the members, where the opposite ends of the members are engaged with one another and arranged one within the other. The members are secured to each other at one end and have the opposite ends terminating in substantially coplanar relation with one member movable relative to the other in response to applications of force to the end thereof, for providing compression stresses in the inner member and tension stresses in the other member, including the spaced parallel portions thereof. Suitable measuring means associated with the spaced parallel portions cooperate to measure both the compression and tension stresses in said members for combining these measurements and provide a very sensitive means for measuring variations in the forces applied to said members, even though the forces normally involve very high pressures.

In the drawings:

FIG. 1 is a vertical transverse cross section of a force measuring instrument, constructed according to the invention.

FIG. 2 is a view taken at right angles to FIG. 1, having the central portion broken away and shown in cross section to illustrate details of construction of the force responsive members.

FIG. 3 is a horizontal cross section taken on line 3—3 of FIG. 1.

FIG. 4 is a horizontal cross section taken on line 4—4 of FIG. 2.

FIG. 5 is a fragmentary vertical cross section, showing application of an instrument constructed according to the invention to a wall portion with one of the force responsive members formed with a projection extending through an aperture in the wall portion and having a frusto-conical shaped end portion for cooperation with a complementary portion of the wall portion, to retain a flexible barrier in sealed relation in said aperture with the outer surface in substantially coplanar relation with the adjacent surface of the wall portion.

FIG. 6 is a vertical fragmentary cross section similar to FIG. 5, showing a substantially cylindrical projection on one of the force responsive members extending through a substantially cylindrical aperture in a wall portion for supporting flexible barriers on the end with the outer surface in substantially coplanar relation with the adjacent wall surface.

FIG. 7 is another fragmentary vertical cross section of an instrument attached to a wall portion having an aperture where the projection on the instrument extends into the aperture in the wall portion and terminates between the opposite surfaces of the wall portion in supporting a flexible barrier to prevent fluid from penetrating into the instrument.

FIG. 8 is a fragmentary vertical cross section of an instrument of the character shown in the preceding figures in which the force responsive members are constructed in a slightly different manner, having both members formed with spaced parallel portions extending intermediate the ends thereof, which are responsive to forces applied to the end of one of the members.

FIG. 9 is a vertical fragmentary cross section taken at right angles to FIG. 8, with portions shown in elevation.

FIG. 10 is a horizontal cross section taken on line 10—10 of FIG. 9.

The instrument as shown in FIGS. 1–4 inclusive, has a casing generally indicated at 1, formed of a body 2 and a lower end cap 3. Body 2 has a compartment 4 extending longitudinally from end to end. At the lower end compartment 4 opens into chamber 5, which is closed by lower end cap 3. Chamber 5 provides space within the body for mounting the terminals of electrical wires for connecting the measuring means responsive to variations in stresses in the instrument, so that they may extend outwardly through a conduit connection 6 on one side of body 2, for connection with the instruments which record or register the variation in forces applied to the instrument in a manner well known to the art.

The opposite end of body 2 is formed with a recess 7 with which compartment 4 connects. Recess 7 forms a shoulder 8 on the body about the end of compartment 4. A pair of force responsive members 9 and 10 are mounted in the casing, as shown in FIGS. 1 to 4. Force responsive member 9 is formed at one end to provide an insert or supporting portion 11 in the form of an angular flange slidably engaged in recess 7 in body portion 2 with the inner face engaging shoulder 8 and an outer marginal portion in substantially coplanar relation with the end of body 2. Member 9 has a head 12 connected to insert or supporting portion 11, by a pair of spaced parallel intermediate portions 13. Head 12 and the adjacent parts of portion 13 are formed to provide a socket for slidably receiving the adjacent end of force responsive member 10. A screw 14 threaded into the end of force responsive member 10 engaged in the socket, extends through head 12 and secures member 10 to head 12. The intermediate portion of member 10 extends in coaxial spaced parallel relation between spaced intermediate portions 13 and has the opposite or free end of the member 10 formed with a force receiving end 25 slidably engaged in a cylindrical or cylinder portion formed in insert portion 11 of force responsive member 9 and projection 15 extending from the outer face of portion 11. The lower inner end of the force receiving end 25 on member 10, as shown in FIG. 1, for example, provides an annular surface in adjacent opposed relation to a shoulder formed on member 9. This annular surface of end 25 on member 10 is spaced from the shoulder just sufficient to allow free relative movement between the members within the elastic limit thereof in one direction. The spacing is such that end 25 will engage the shoulder and limit relative movement of the members when excessive forces are applied to the members that would damage them. The other figures show similar means for limiting movement of one member relative to the other in one direction. The free force receiving end 25 of member 10 terminates in substantially coplanar relation with the end of projection 15 to provide a substantially flat face. Supporting portion 11 has the extremity of projection 15 formed with a coextensive supporting surface or substantially flat face arranged in opposed or complementary relation to seat portion 20 on wall portion 17. One side of a flexible barrier 16 is engaged with the flat face of force responsive members 9 and 10 as shown in FIGS. 1 and 2 for sealing the members from fluid pressure applied to the opposite face of the barrier. The upper end of body 2 as shown in FIGS. 1 and 2 is detachably secured to the face of a wall portion or cap member 17. Wall portion or cap member 17 is formed with an aperture 18 opening into a recess 19 having a portion formed to slidably receive projection 15 on insert 11.

Annular seat 20 is formed on an inner wall surface of cap member 17 in opposed relation to the outer marginal portion of projection 15 so that the marginal portion of flexible barrier 16 which has the central portion engaging over the end of the projection may be gripped and sealed to prevent the loss of fluid under pressure through aperture 18 and recess 19. The opposite end of wall portion or cap member 17 may be attached to a suitable vessel, wall, or other part of any member having variable pressure or force applied to the surface thereof, which it is desired to have the instrument measure.

In FIGS. 1 and 2 the upper or outer face of cap member 17 is formed with a threaded recess for receiving a fitting of conventional form that may be used for attaching a suitable pipe connection thereto to convey fluid from a suitable source under pressure to the instrument for application to barrier 16.

Body 2 is securely bolted to cap member or wall portion 17, by a plurality of bolts, as shown in FIGS. 1 and 3. Sealing rings of any suitable construction may be used for effectively sealing the body against cap member 17, such as indicated at 21, for the purpose of effectively preventing the leakage of fluid from the cap member even though the fluid is under extremely high pressure, such as 30,000 pounds per square inch.

Suitable measuring means which may be of any desired construction now well known in the art, is used for measuring the variations in stress created by force applied to the end of member 10 engaged with flexible barrier 16. For example, strain gauges, indicated diagrammatically at 22, are applied to the spaced parallel intermediate portions 13 of force responsive members 9 and the intermediate portions of force responsive member 10. These strain gauges are connected in a suitable electrical circuit of any one of several types well known in the art, that will be responsive to stress variations in said force responsive members under the application of force to member 10. Force responsive member 10, as shown in FIGS. 1 and 2, is of the post type in which the intermediate portion has a slightly reduced size from the opposite end portions. When forces are applied to the free end 25 of force responsive member 10 and engaged with flexible barrier 16, it will cause longitudinal compression stresses to develop in member 10 which will be applied to head 12 for producing a downward pressure thereon, as shown in FIG. 1. This provides tensioning stresses in spaced parallel intermediate portions 13 of force responsive member 9.

The strain gauges applied to these two members will have those on member 10 compressed and those on member 9 stretched or tensioned according to the variations of compression and tension stresses in each of the members, resulting from force applications to member 10. This combination of members 9 and 10 subject to compression and tension stresses, provides a highly sensitive structure for measuring high fluid pressures and other forces, while at the same time providing a rugged instrument structure, where the members have substantial strength in order to withstand the substantially high pressures applied thereto. By the use of both compression and tensioning stresses in connection with the measuring means or instrument for these stresses, a much more sensitive measurement of force and variations thereof can be made. The electrical connections with the strain gauges indicated at 22 and the instruments used in the circuit for measuring variations in force are not shown in the drawings because they are of conventional type, well known in the art.

FIG. 5 shows an instrument of the type shown in FIGS. 1 to 4 inclusive, applied to the wall portion of a vessel, or other type of structure, having forces applied to the surface thereof, which it is desired to measure. The wall portion is indicated at 30 with the surface 31 having fluid under pressure or other forces which it is desired to measure applied thereto. Wall portion 30 is formed with an extension 32 from one side thereof to provide a mounting for the casing of the force measuring instrument. Wall portion 30, at the portion formed with extension 32, is formed with an aperture 33 opening through opposite faces thereof and has the end opening through surface 31 reduced in size from that opening through the face of extension 32. The surface of wall portion 30 in the aperture has a frusto-conical shape forming a seat portion, as illustrated in FIG. 5, at the outer end of the aperture opening through surface 31, while the opposite end is substantially cylindrical in shape. This frustro-conical seat portion is indicated at 33'.

The force measuring instrument 34, shown in FIG. 5, has the body portion formed with an annular flange 35 on the upper end engaged against the face of extension 32 and securely bolted thereto with suitable sealing washers sealing the joint against leakage. Force measuring instrument 34 has a pair of force responsive members 36 and 37, constructed in the same manner as members 9 and 10 respectively, as shown in FIGS. 1 to 4, with a variation in the construction of the free ends of these members which will now be described.

Force responsive member 36 has an insert or supporting portion or annular flange seated in the body of the instrument in the same manner as shown in FIG. 1, but which is formed with a projection 38 of cylindrical form equal in size to the insert and extending into aperture 33 so that the cylindrical portion of the projection slidably engages the cylindrical wall portion forming the outer end of aperture 33. The outer end of projection 38 has a frustro-conical formation, as shown in FIG. 5, so that the free end terminates in a plane slightly spaced from the wall surface 31 to receive and support flexible barrier 39 with the outer surface flush with wall surface 31 where it extends across the end of projection 38.

Force responsive member 37 is formed with an extension 40 on the free end thereof that is substantially elongated in comparison with member 10, as shown in FIG. 1, so that it extends throughout the length of projection 38 with the outer free force receiving end 41 slidably engaged in projection 38. The end surface of end 41 on extension 40 engages the inner surface of flexible barrier 39 and supports the central portion of the barrier. The marginal portion of flexible barrier 39 extends in angular relation to the central portion thereof to engage between the frustro-conical wall portion of aperture 33 forming seat portion 33' and the frustro-conical end surface formed on projection 38. When instrument 34 is bolted to wall portion 30 the end of projection 38 will engage the marginal portion of flexible barrier 39 and effectively seal it against the adjacent surface and seat portion 33' of wall portion 30 to prevent leakage of fluid pressure. Instrument 34 is constructed otherwise in the manner described above in connection with FIGS. 1 to 4 so that force applied to the end 41 of extension 40 on force responsive member 37 will set up compression stresses in members 37 and 36 respectively, that may be measured in the manner above described, in connection with the instrument shown in FIGS. 1 to 4. The instrument shown in FIG. 5 provides a structure where the ends of the force responsive members supporting flexible barrier 39, form a flush surface construction with wall surface 31 to prevent turbulence of fluids passing over the wall surface, so that force variations in the fluid will be fully applied in the operation of the instrument without creating turbulance in the fluid which may otherwise interfere with the accurate measurement of the forces.

FIG. 6 shows a modified form of instrument similar to that shown in FIGS. 1 and 5. Wall portion 43 is formed with an extension 44 for mounting force measuring instrument 45 constructed in substantially the same manner as the instruments previously described, but with a variation which will now be described. Force measuring instrument 45 has a pair of force members 46 and 47 constructed in the same manner as above described, but having the free ends of each of the members formed with cylindrical projections 48 and 49, respectively. Cylindrical projections 48 and 49 are arranged in coaxial relation with projection 49 slidably engaged in projection 48. Projection 48 slidably engages in a cylindrical aperture formed in wall portion 43 and extension 44, in transversely extending relation. The ends of projections 48 and 49 terminate in substantially coplanar relation and have a flexible barrier 50 engaged over the end surface thereof with the marginal portion engaging about the outer cylindrical surface portion of projection 48, as shown in FIG. 6. The end of projection 48 has the end and side surfaces providing a coextensive supporting surface for the barrier and force receiving end 52 on projection 49 cooperates in supporting the barrier by having its outer end surface coextensive with that on projection 48. The edge of flexible barrier 50 may be suitably secured to the cylindrical surface of projection 48 at a position spaced inwardly from the end, as shown in FIG. 6, by a suitable sealing means of conventional character, as shown in FIG. 6. This may be in the form of cement, solder or other suitable means of a type well known in the art, according to the type of sheet material used in the construction of the barrier. The assembled instrument with projections 48 and 49 and flexible barrier 50 slidably engages in wall portion 43 and extension 44, in such a manner, that barrier 50 will effectively seal the joint between the outer surface of projection 48 and the surface of the aperture formed in wall portion 43 and extension 44 through engagement with cylindrical seat portion 53 of wall portion 43. Projection 48 has a diameter slightly less than that of the insert, supporting portion, or flange 51 formed on one end of force responsive member 46, as shown in FIG. 6. This provides a shoulder so that a sealing ring of suitable character may be engaged therewith and retained against a seat portion 53' formed on extension 44 about the aperture therein to substantially seal the joint between projection 48 and the end of extension 44.

The structure shown in FIG. 6 provides a means of attaching the force measuring instrument to the wall portion of a suitable structure where it is desired to measure force and variations thereof, applied to one surface in which the surface of the flexible barrier is flush with the surface of the wall portion to which the forces are applied. This structure will eliminate turbulence in the fluid adjacent the instrument so that forces applied to cylindrical projection 49 through the barrier will operate the instrument so the forces can be accurately measured.

FIG. 7 shows another form of instrument and wall structure in which wall portion 55 has a cylindrical aperture extending there-through and also a boss 56 on the outer surface thereof having a seat portion 56' about the aperture to provide a face for mounting force measuring instrument 57. Insert or supporting portion 58 of force responsive member 59 is mounted in the casing of the instrument in the same manner as the structure shown in FIG. 1, and has a projection 60 of smaller size than the aperture in wall portion 55, extending only partially into the aperture, as shown in FIG. 7. Flexible barrier 61 covers the end surface of force responsive member 59 and also the force receiving end 64 of force responsive member 62 so that fluid pressures applied to the outer surface of the barrier within the aperture in wall portion 55 will be transmitted to the ends of force responsive members 59 and 62. The marginal portion of flexible barrier 61 extends across the upper face of insert 58 beyond projection 60 and engages the face of a sealing gland 63. Sealing gland 63 and the marginal portions of barrier 61 are coextensive between the aperture and wall portion 55 to the outer edge of boss 56 so that the opposed surface of the casing, the boss and insert 58 will intimately engage and compress the sealing gland and barrier into firm sealing engagement with the seat portion 56' about the aperture in wall portion 55 to prevent leakage of fluid through the aperture. Force responsive members 59 and 62 are otherwise constructed in substantially the same manner as shown in FIGS. 1 to 4, for measurement of tension and compression stresses applied thereto.

FIGS. 8 to 10 show another form of the invention where a variation is made in the construction of the force responsive members. The body portion of the instrument which may be constructed, as shown in FIG. 1, is illustrated at 65. Body portion 65 has the recess in the upper end forming the shoulder for receiving insert or supporting portion 66 formed on the upper end of force responsive member 67. Member 67 is formed in substantially the same manner as force responsive member 9 in FIG. 1. The central portion of insert or flange portion 66 is formed with an aperture having the same size as the dimension between the intermediate portions of force responsive member 66, as shown in FIGS. 8 to 10.

Force responsive member 68 has a cylindrical head portion 69 secured to the head portion on force responsive member 67 at the lower end opposite to insert 66 in the same manner as the construction shown in FIG. 1. The intermediate portion of force responsive member 68 is formed with spaced parallel strip portions 70 connected at the opposite or upper ends to a cylindrical force receiving end 71 projecting outwardly from the upper surface or flange 66 and slidably engaged in a cylindrical opening in guide plate 72. This provides the force responsive members 67 and 68 with two pairs of spaced parallel strip portions arranged adjacent one another, in the manner shown in FIG. 8, spaced substantially equidistant on opposite sides of the longitudinal axis of the members. This structure provides a more sensitive force responsive member for the inner of the two members than the post type of member shown in FIG. 1 at 10.

Insert or supporting portion 66 is secured to body portion 65 by a pair of screws 73 shown in FIG. 9, while guide plate 72 has a projection and a pair of screws 74 securely attaching it to insert or supporting portion 66, as shown in FIG. 8. Guide plate 72 and insert 66 form a two part insert or flange structure at the upper end of force responsive member 67 designed to facilitate the assembly of force responsive member 68 within member 67, as illustrated in FIGS. 8 to 10 and for retention of member 68 within member 67 after assembly of guide plate 72 on insert 66. Guide plate 72 is notched at opposite portions to accommodate the heads of screws 73, in the manner shown in FIG. 9. The force responsive members shown in FIGS. 8 to 10 are subjected to the application of forces that will provide compression stresses in spaced parallel strip portions 70 and tension stresses in the intermediate spaced parallel portions of member 67 for measurement by stress sensitive means, of a type well known in the art.

It will be understood that the force measuring instrument provided by this invention is constructed so that force and force variations applied to the free end of the inner member movable relative to the outer member will cause stress variations in both members in which the stresses in the inner members will be compression stresses and those in the outer member will be tension stresses. With this type of stress application to the force responsive members it is possible to apply means for measuring these stresses to the instrument in association with the pair of force measuring members in such a way that greater efficiency in the measurement of forces and force variation is obtained, particularly where substantially high pressures are to be measured. By the use of this pair of force responsive members, an instrument is constructed that will withstand very high pressure, and at the same time, provide a structure that is highly sensitive to small variations in pressure.

The construction of the projection on the instrument, particularly on one of the force responsive members, enables the application of the instrument to various types of structures such as rockets, guided missiles, jet motors, airplane wings, ship hulls and many different types of vessels containing fluid under pressure, so that forces and variations in the forces may be measured in a most efficient manner through the use of an instrument structure where the ends of the force responsive members are situated in a substantially flush position with the wall surface where the pressures are applied, so that accurate measurement of the pressures can be made. This flush mounting of one end of the force responsive members enables more accurate measurement of pressures through substantial elimination of turbulence of fluids, particularly where they are moving at high speeds, as well as having high pressures.

The invention claimed is:

1. The combination of a member having a wall portion formed with an aperture and a seat portion about the aperture, force measuring means having a supporting portion formed with a projection shaped to fit in said aperture to engage said seat portion in complementary relation, and a force responsive member at the end of said projection slidably engaged in said supporting portion having the outer end cooperating with the outer end of said supporting portion to provide a coextensive imperforate supporting surface, and a flexible barrier covering the end of said projection, engaged with said force responsive member and engaging and covering said coextensive supporting surface, having a marginal portion engaging said seat portion and retained in sealed relation by said projection with the intermediate portions positioned with one surface in substantially coplanar relation to the inner wall surface of said wall portion adjacent said aperture, whereby said barrier will transmit force applied to the exposed surface of said barrier at one side of said wall portion to said force measuring means through said force responsive member for measurement.

2. A force measuring instrument comprising a casing carrying means for measuring variations in force, a projection carried by the body of said casing having the extremity formed to provide a coextensive supporting surface, supporting means having a wall portion formed with an opening having a marginal seat portion receiving at least part of the surface on the extremity of said projection in complementary relation, force responsive means having a force receiving end slidably engaged in the end of said projection having an end surface coextensive with said supporting surface on said projection, a flexible barrier extending transversely across said aperture, engaging the supporting surface on said projection and end surface on said force receiving end and having the marginal portions engaging and retained in sealed relation against said seat portion by the end of said projection, and means for securing said casing to said supporting means, whereby said barrier engages and transmits force to the force receiving end of said force responsive means for transmission to said means for measuring variations in force so that variations in force applied to the wall portion of said supporting means may be measured.

3. A force measuring instrument, comprising a casing having one end formed with a recess opening outwardly and a shoulder facing outwardly through said recess, an insert mounted in said casng with the periphery slidably engaging the walls of the casing defining said recess and the inner margin engaging said shoulder, means for attaching said casing to a wall section formed with an aperture having a seat portion about said aperture, a flexible barrier having the marginal portion engaging said seat portion and an intermediate portion extending across said aperture, said insert having an outer end portion formed with a coextensive imperforate supporting surface to engage and retain said barrier in sealed relation against said seat portion, and force measuring means carried by said insert having a force receiving end slidably engaging in a cylinder portion formed in said insert and an end supporting surface coextensive with said supporting surface on said insert engaging said barrier opposite said aperture and throughout the area not engaged with said insert for measuring forces transmitted thereto through said barrier.

4. A force measuring instrument of the character set forth in claim 3, wherein said insert has a projection formed with a frusto-conical end engaging the margin of said barrier and retaining it in sealed relation against a similar complementary seat portion on said wall portion for positioning the central portion of said barrier in substantially coplanar relation with one surface of said wall portion.

5. A force measuring instrument of the character claimed in claim 3, wherein, said insert has a projection slidably engaged in said aperture, extends through said aperture from one side of said wall portion to the other, and supports said barrier with one surface in substantially coplanar relation to said other side and seals the marginal portion of said barrier on said seat portion within said aperture.

6. A force measuring instrument comprising a casing, an insert mounted in said casing, means for attaching said casing to one side of a wall section over an aperture formed therein, a projection mounted on said insert extending outwardly therefrom and slidably engaging in said aperture having a free end terminating adjacent the opposite side of said wall section, a flexible barrier extending across and engaging the free end of said projection in substantially coplanar relation with said opposite side of said wall section and having a marginal portion extending between an adjacent portion of said insert and wall portion, means sealing the insert, barrier and wall portion relative to one another, force measuring means having portions mounted on said insert with a force receiving end portion operatively engaged in a chamber formed in said projection the outer face of said portion engaging one face of said barrier throughout the area not engaged with said insert and sensitive to force applied to said barrier for measurement by said force measuring means.

7. A force measuring instrument comprising a casing having a body formed with a compartment opening through at least one end, a recess formed in said end of said body about said compartment and forming a shoulder, a pair of force responsive members, means attaching said members together at one end for support of one by the other, a flange on the opposite end of one of said members engaged in said recess in said body and seated on said shoulder for supporting said members in said compartment in said body, said flange having an aperture in the central portion forming an inner wall portion, a force receiving end on the opposite end of the other of said members slidable in said aperture in engagement with said inner wall portion of said flange of said one of said members, said force receiving end being formed at the inner end to engage a shoulder on said one member for limiting relative movement of said members to each other to a predetermined amount within the elastic limit of said members, said members having spaced portions extending between said ends, measuring means engaging said spaced portions of said members for measuring variations in stress in said members, and means for attaching said casing to a structure where force may be applied to the force receiving end on the other of said members for applying compression stress to the other of said members and tension stress to said one of said members for measurement by said measuring means.

References Cited in the file of this patent

UNITED STATES PATENTS

| | | |
|---|---|---|
| 2,347,188 | Grand | Apr. 25, 1944 |
| 2,472,045 | Gibbons | May 31, 1949 |
| 2,509,421 | Carter | May 30, 1950 |
| 2,582,886 | Ruge | Jan. 15, 1952 |
| 2,637,210 | Hathaway | May 5, 1953 |
| 2,679,760 | Harland et al. | June 1, 1954 |
| 2,748,602 | Weber | June 5, 1956 |
| 2,814,946 | Harris | Dec. 3, 1957 |

FOREIGN PATENTS

| | | |
|---|---|---|
| 683,367 | Great Britain | Nov. 26, 1952 |
| 1,065,113 | France | Dec. 30, 1953 |